United States Patent
Mosier et al.

(10) Patent No.: US 11,429,224 B2
(45) Date of Patent: Aug. 30, 2022

(54) ELIMINATING INTERCONNECT INDUCED INACCURACIES AND REDUCING SCAN TIME USING A HIGH GRANULARITY RESISTIVE TOUCH SCREEN

(71) Applicant: Rockwell Collins, Inc., Cedar Rapids, IA (US)

(72) Inventors: Donald E Mosier, Cedar Rapids, IA (US); Thomas B. Campbell, Cedar Rapids, IA (US); Stan Sandoval, Cedar Rapids, IA (US); Alan M Kuefler, Marion, IA (US); Brian Grunewaldt, Marion, IA (US); Clint L. Gosch, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/143,016

(22) Filed: Jan. 6, 2021

(65) Prior Publication Data
US 2022/0214793 A1 Jul. 7, 2022

(51) Int. Cl.
*G06F 3/045* (2006.01)
*G06F 3/041* (2006.01)

(52) U.S. Cl.
CPC .......... *G06F 3/04166* (2019.05); *G06F 3/045* (2013.01); *G06F 3/0418* (2013.01)

(58) Field of Classification Search
CPC ..... G06F 3/04166; G06F 3/0418; G06F 3/045
See application file for complete search history.

(56) References Cited

U.S. PATENT DOCUMENTS

| 5,159,159 | A | * | 10/1992 | Asher | G01L 1/205 |
| | | | | | 178/18.05 |
| 5,392,058 | A | * | 2/1995 | Tagawa | G06F 3/0446 |
| | | | | | 345/173 |
| 5,534,892 | A | * | 7/1996 | Tagawa | G06F 3/0446 |
| | | | | | 345/173 |
| 8,330,741 | B1 | * | 12/2012 | Camarota | G06F 3/045 |
| | | | | | 345/174 |
| 8,421,772 | B2 | * | 4/2013 | Li | G06F 3/045 |
| | | | | | 178/18.05 |

(Continued)

FOREIGN PATENT DOCUMENTS

| DE | 102012220093 A1 | 5/2013 |
| WO | 2010016736 A9 | 5/2010 |

OTHER PUBLICATIONS

Extended Search Report in European Application No. 21218225.7 dated May 20, 2022, 10 pages.

*Primary Examiner* — Benyam Ketema
(74) *Attorney, Agent, or Firm* — Suiter Swantz pc llo (57) ABSTRACT

A touchscreen device utilizes digital scan to resolve a touch location with high precision. The touchscreen device includes touchells of about 3.175 mm by 3.175 mm (0.125 inches by 0.125 inches). An integrated circuit detects contacts in the touchells that resolve to touches on the touchscreen, and communicates those touches to a micro-controller via a serial bus. Silver epoxy interconnects for the tracks are reduced or eliminated. Multiple touchscreens having distinct touchell networks may be disposed to create a larger touchscreen area. Similarly, a single touchscreen may be divided quadrants, each with a distinct touchell network.

17 Claims, 5 Drawing Sheets

(56) References Cited

U.S. PATENT DOCUMENTS

| | | | | |
|---|---|---|---|---|
| 8,519,965 B2* | 8/2013 | Cady | | G06F 3/0446 |
| | | | | 178/18.05 |
| 8,587,557 B2 | 11/2013 | Lin et al. | | |
| 8,599,565 B2* | 12/2013 | Kondoh | | G06F 3/045 |
| | | | | 361/748 |
| 8,947,393 B2* | 2/2015 | Hwang | | G06F 3/047 |
| | | | | 345/174 |
| 8,982,092 B2 | 3/2015 | Lee | | |
| 9,081,450 B1* | 7/2015 | Mohindra | | G06F 3/045 |
| 9,134,827 B2* | 9/2015 | Small | | G06F 3/04166 |
| 9,372,509 B2* | 6/2016 | Chang | | G06F 3/0448 |
| 9,612,677 B2* | 4/2017 | Brunet | | G06F 3/0446 |
| 9,710,095 B2 | 7/2017 | Hotelling et al. | | |
| 10,001,894 B2* | 6/2018 | Papakostas | | G06F 3/045 |
| 10,275,078 B1* | 4/2019 | Harwood | | G06F 3/045 |
| 10,474,304 B1 | 11/2019 | Gallardo | | |
| 10,908,729 B2* | 2/2021 | Hotelling | | G06F 3/044 |
| 2002/0149572 A1* | 10/2002 | Schulz | | G06F 3/0443 |
| | | | | 345/174 |
| 2006/0097991 A1 | 5/2006 | Hotelling et al. | | |
| 2009/0267903 A1* | 10/2009 | Cady | | G06F 3/04166 |
| | | | | 345/173 |
| 2010/0321214 A1* | 12/2010 | Wang | | G06F 3/04166 |
| | | | | 341/20 |
| 2011/0122088 A1 | 5/2011 | Lin et al. | | |
| 2012/0212425 A1 | 8/2012 | Schmidt et al. | | |
| 2013/0015906 A1* | 1/2013 | Yeh | | G06F 3/0446 |
| | | | | 327/517 |
| 2013/0127739 A1* | 5/2013 | Guard | | G06F 3/0445 |
| | | | | 345/173 |
| 2013/0207924 A1* | 8/2013 | Mohindra | | G06F 3/0443 |
| | | | | 345/174 |
| 2015/0242022 A1* | 8/2015 | Hung | | G06F 3/0446 |
| | | | | 345/174 |
| 2016/0054844 A1 | 2/2016 | Lin et al. | | |
| 2016/0188098 A1* | 6/2016 | Her | | G06F 1/1652 |
| | | | | 345/173 |
| 2017/0131809 A1* | 5/2017 | Lin | | G06F 1/1652 |
| 2017/0139521 A1* | 5/2017 | Mosier | | G06F 3/0412 |
| 2017/0153739 A1 | 6/2017 | Ahn | | |
| 2019/0087042 A1 | 3/2019 | Ostrand et al. | | |
| 2020/0190372 A1* | 6/2020 | Kim | | C09J 7/25 |
| 2020/0241670 A1* | 7/2020 | Abu Saude | | G06F 3/045 |

* cited by examiner

ELIMINATING INTERCONNECT INDUCED INACCURACIES AND REDUCING SCAN TIME USING A HIGH GRANULARITY RESISTIVE TOUCH SCREEN

BACKGROUND

Existing digital resistive touchscreen designs utilize a number of horizontal and vertical oriented Indium-Tin-Oxide (ITO) resistive tracks. Where the ITO tracks intersect is called a "touchell". These touchells are typically large, approximately 12.7 mm by 12.7 mm (0.5 inches×0.5 inches). This large size is required to limit the number of traces providing interconnect around the perimeter of the touch screen area. Touch detection is achieved through digital scan, which is quick but lacks granularity, and/or analog scan, which offers good measurement granularity and positional data but requires slower analog to digital conversion and data processing. Digital scan and analog scan have been used together to quickly detect a touch using digital scan then performing a more intensive and accurate analog scan in the detected area to precisely locate the touch.

These methods allow a relatively low resolution digital resistive touch screen to provide high resolution positional data, but the scans, data acquisition, and processing take significant time to accomplish. Furthermore, the silver epoxy traces used around the perimeter to provide interconnect add resistance to the analog measurement which degrades accuracy and must be factored out using the touch controller software. Verifying such complex software can be expensive.

SUMMARY

In one aspect, embodiments of the inventive concepts disclosed herein are directed to a touchscreen device utilizing digital scan to resolve a touch location with high precision. The touchscreen device includes touchells of about 3.175 mm by 3.175 mm (0.125 inches by 0.125 inches). An integrated circuit detects contacts in the touchells that resolve to touches on the touchscreen, and communicates those touches to a micro-controller via a serial bus. In a further aspect, silver epoxy interconnects for the tracks are reduced or eliminated.

In a further aspect, multiple touchscreens having distinct touchell networks are disposed to create a larger touchscreen area. Similarly, a single touchscreen may be divided quadrants, each with a distinct touchell network.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a touchscreen device utilizing digital scan to resolve a touch location with high precision. The touchscreen device includes touchells of about 3.175 mm by 3.175 mm (0.125 inches by 0.125 inches). An integrated circuit detects contacts in the touchells that resolve to touches on the touchscreen, and communicates those touches to a micro-controller via a serial bus. In a further aspect, silver epoxy interconnects for the tracks are reduced or eliminated. In a further aspect, multiple touchscreens having distinct touchell networks are disposed to create a larger touchscreen area. Similarly, a single touchscreen may be divided quadrants, each with a distinct touchell network.

Figure 1:
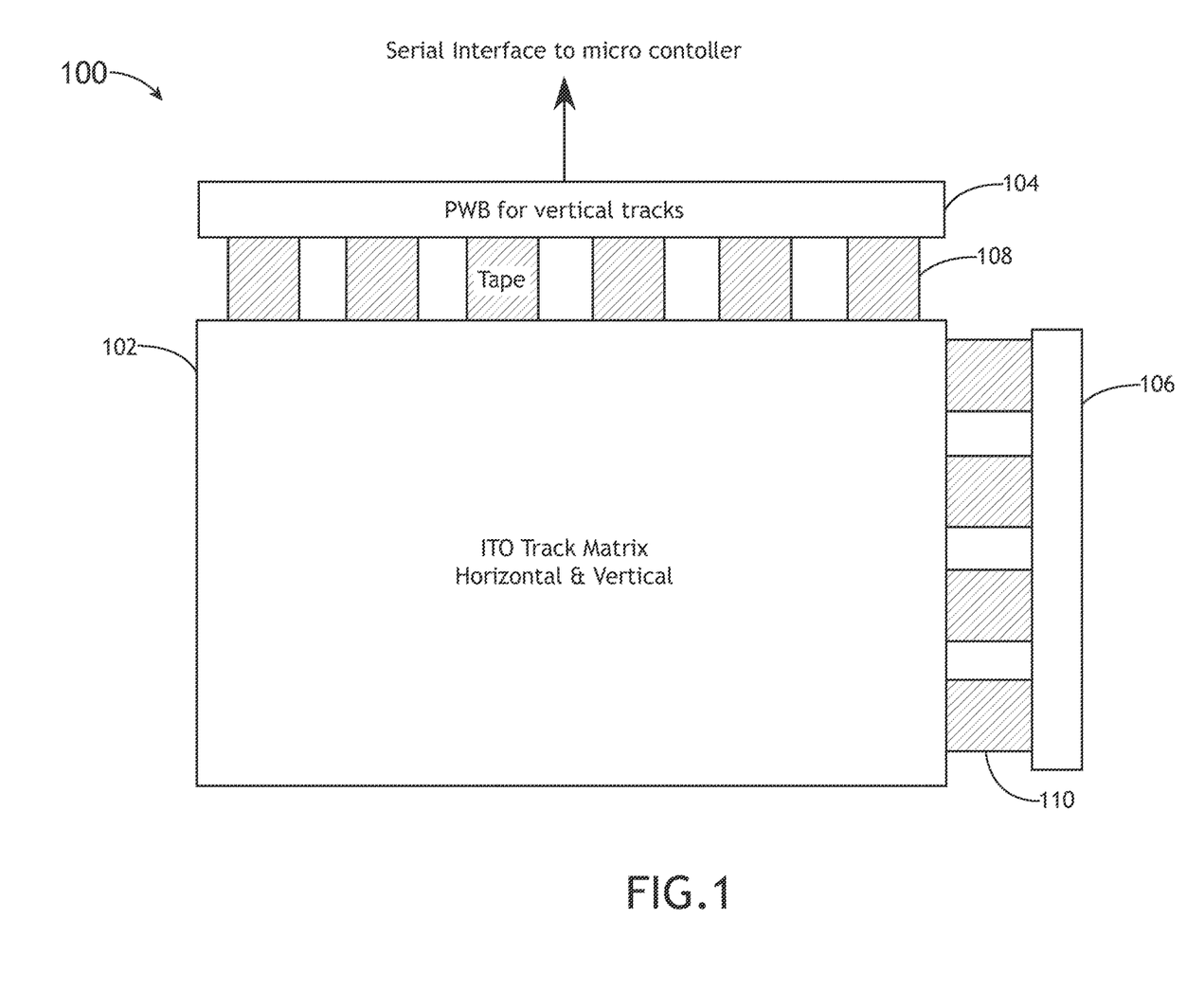
FIG. 1 shows a block diagram of a resistive touch element for a touch screen according to an exemplary embodiment.

Referring to FIG. 1, a block diagram of a resistive touch element 100 for a touch screen according to an exemplary embodiment is shown. The resistive touch element 100 includes an ITO track matrix 102 including electrically separate horizontal tracks and electrically separate vertical tracks. Where a horizontal track and vertical track overlap defines a touchell. The vertical tracks are connected to a vertical track printed wiring board 104 via a plurality of vertical interconnects 108. Likewise, the horizontal tracks are connected to a horizontal track printed wiring board 106 via a plurality of horizontal interconnects 110. Conductive resistive sheathing is more tolerant of variations that could cause serious errors in the pure digital resistive regime.

In at least one embodiment, the vertical tracks may be spaced 3.175 mm (0.125 inches) or less apart; likewise, the horizontal tracks may be spaced 3.175 mm (0.125 inches) or less apart. Narrow spacing may allow contacts identified via digital scan to closely resolve the location of a touch without the need for an analog scan. Removing analog scan eliminates the need for complicated algorithms for determining where the touch occurred.

Reducing the touchell size reduces parasitic capacitance of the sensed tracks, allowing for shortened settling times, faster scans, and reducing overall touch detection latency. Existing resistive touch screens include silver epoxy conductors which are a source of excess resistance that must be accounted for during analog scan; placing tracks closer together would cause electrical interference in the silver epoxy conductors during analog scan. Because embodiments of the present disclosure do not employ analog scan, such interference is obviated.

Each of the vertical track printed wiring board 104 and horizontal track printed wiring board 106 and connected to a processor via a serial interface. The interconnects 108, 110 may comprise tapes or flexes that provide interconnect to the high density ITO track matrix 102 though anisotropic conductive film bonding techniques.

Figure 2:
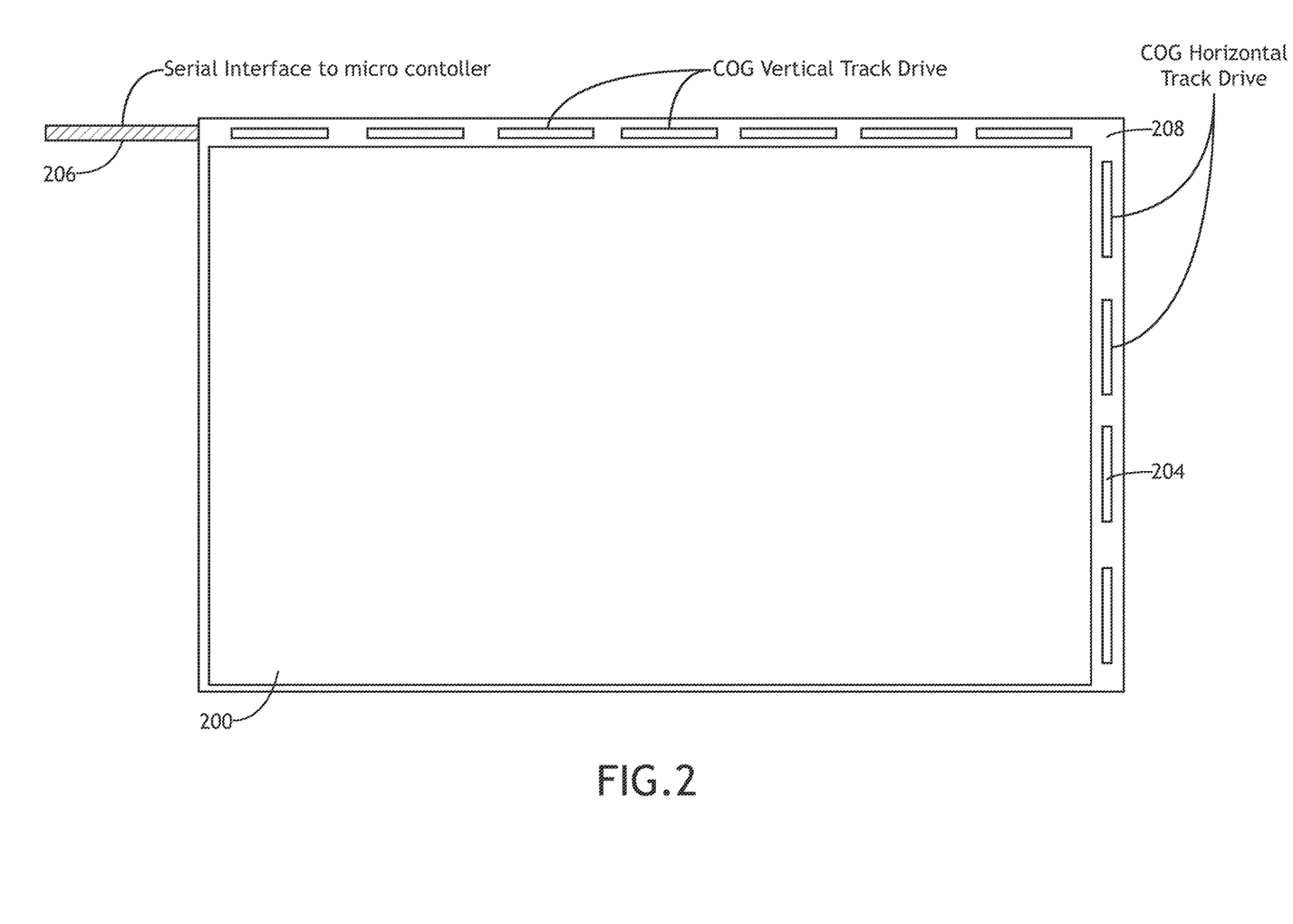
FIG. 2 shows a block diagram of a touch screen according to an exemplary embodiment.

Referring to FIG. 2, a block diagram of a touch screen according to an exemplary embodiment is shown. An ITO track matrix 200 is disposed on a substrate 208 with vertical tracks 202 and horizontal tracks 204 defining touchells. The vertical tracks 202 and horizontal tracks 204 are connected to one or more integrated circuits disposed on the substrate 208. The integrated circuits are connected to a processor via a serial interface 206.

Figure 3:
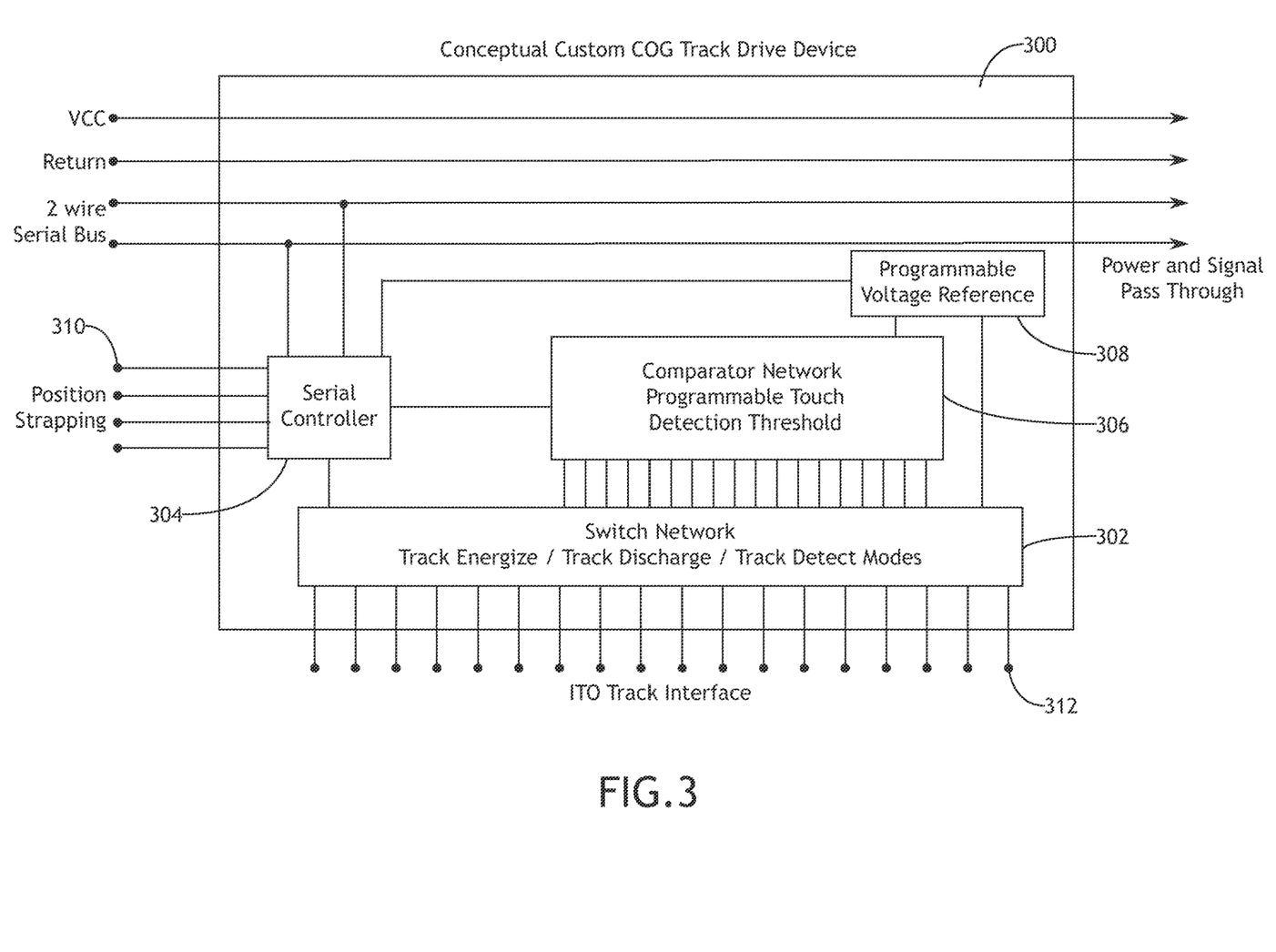
FIG. 3 shows a block diagram of an integrated circuit according to an exemplary embodiment, suitable for use in a resistive touch screen.

Referring to FIG. 3, a block diagram of an integrated circuit 300 according to an exemplary embodiment, suitable for use in a resistive touch screen is shown. The integrated circuit 300 includes a switch network 302 connected to a plurality of vertical tracks or horizontal tracks via a corresponding track interface 312. The switch network 312 may operate in a track energize, track discharge, or track detect mode.

The switch network 302 is in data communication with a programmable comparator network 306 that sends and receives signals to and from the switch network 302. The programmable comparator network 306 identifies one or more tracks where a touch has produced a contact with reference to a programmable voltage reference 308 connected to the programmable comparator network 306 and switch network 302. In at least one embodiment, the programmable comparator network 306 identifies a plurality of electrical contacts in the switch network 302. At least a subset of the plurality of electrical contacts may be identified as a cluster involving a single touch event but multiple, closely spaced electrical contracts.

In at least one embodiment, a serial controller 304 connected to the switch network 302 and programmable comparator network 306 sends signals to the programmable comparator network 306 and switch network 302 according to a plurality of position strapping inputs 310 and serial bus inputs. In at least one embodiment, passthrough features such as a voltage passthrough, return passthrough, and one or more serial bus features may allow interconnect between multiple independent devices.

Multiple integrated circuits 300 may be used to scale to larger touch screens. The serial bus features may be used to control each integrated circuit 300, transfer data representing touch detection, apply threshold programming, enact device mode select, etc. Each integrated circuit 300 may be hardware strap-able to allow all integrated circuits 300 to share the same serial bus. Each integrated circuit 300 may utilize the passthrough features to simplify routing and minimize silver epoxy traces. Integrated circuit attachment could be accomplished via processes similar to existing source driver/board bonding techniques or chip on glass techniques.

In at least one embodiment, the touch screen may be driven from only two sides instead of four. Alternatively, the touch screen may be driven from three sides for redundant applications.

Figure 4:
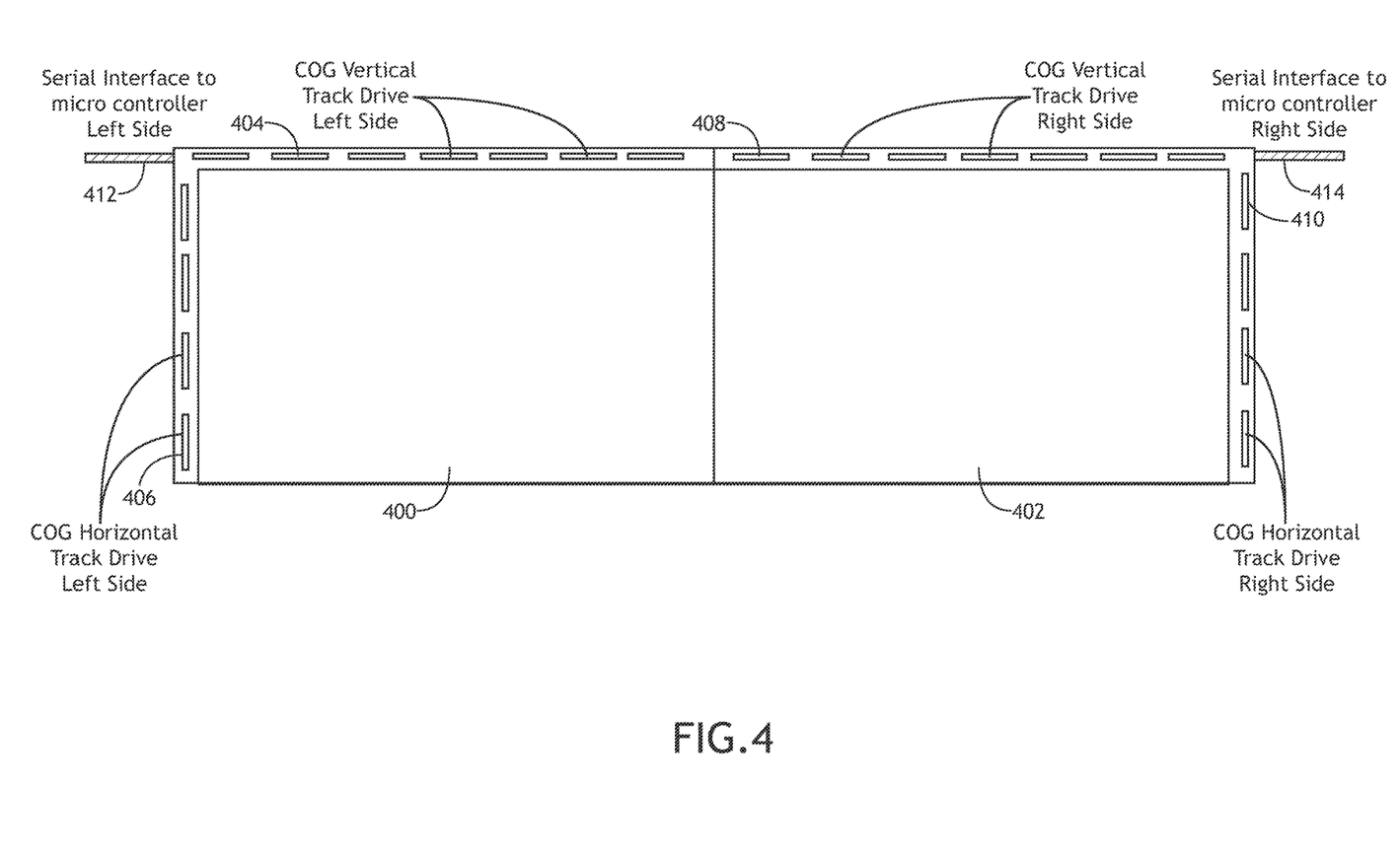
FIG. 4 shows a block diagram of a dual touch screen according to an exemplary embodiment.

Referring to FIG. 4, a block diagram of a dual touch screen according to an exemplary embodiment is shown. Two or more ITO track matrices 400, 402 are disposed on one or more substrates with corresponding vertical tracks 404, 408 and horizontal tracks 406, 410 defining touchells specific to one of the ITO track matrices 400, 402. The vertical tracks 404, 408 and horizontal tracks 406, 410 are connected to one or more integrated circuits disposed on the substrate. The integrated circuits are connected to processors via corresponding serial interfaces 412, 414.

In at least one embodiment, each ITO track matrix 400, 402 can always resolve two touches, but in some circumstances may not be able to resolve more than two touches. Three touches can be detected in a non-redundant configuration, but a fourth touch could cause ghosting issues, so the third touch may be used as a fault condition and blocked to prevent fourth touch anomalies. Certain scanning techniques may increase detectable touch quantity. In at least one embodiment, the two or more ITO track matrices 400, 402 are disposed to serve different sections of a singular display; for example, the two or more ITO track matrices 400, 402 may be disposed side-by-side or covering quadrants of the singular display. Each of the two or more ITO track matrices 400, 402 can separately resolve at least two touches independently.

In at least one embodiment, because interconnects are not necessary on opposing sides of a singular integrated circuit, integrated circuits may be placed around the entire perimeter of the touchscreen and the touchscreen electrically broken up into quadrants, allowing each quadrant to operate independently, decreasing scan time further but at the cost of more interconnect.

Figure 5:
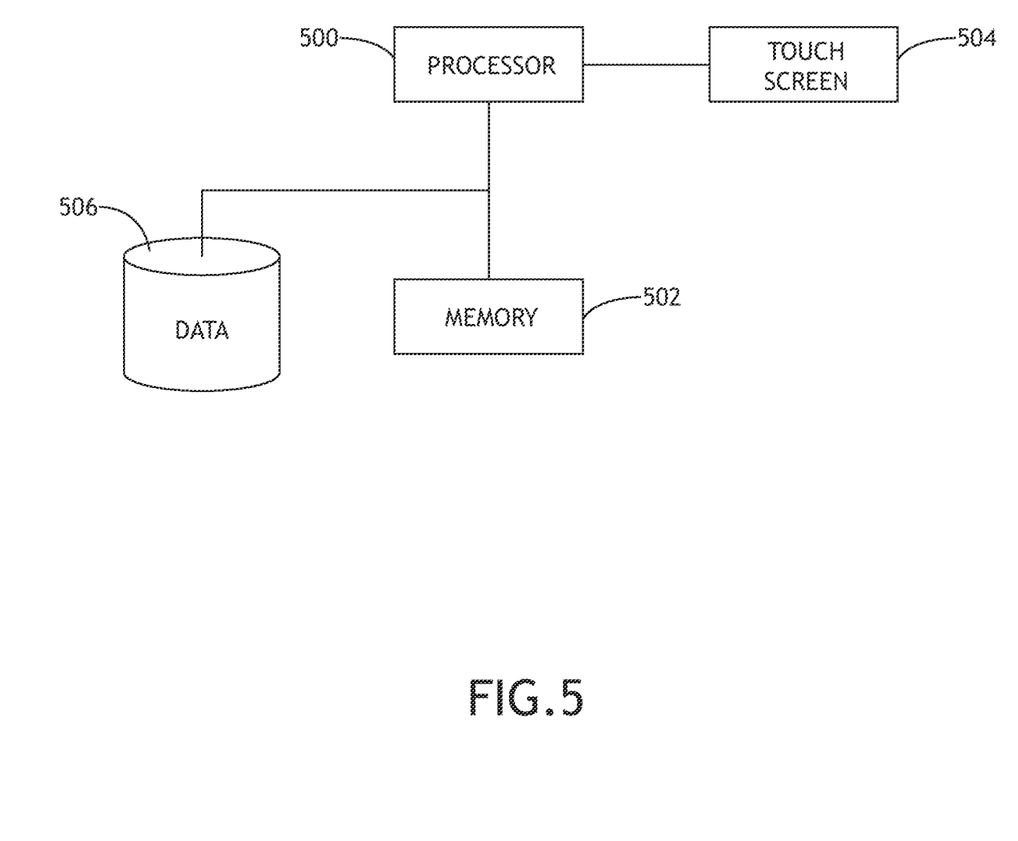
FIG. 5 shows a block diagram of system including a resistive touch screen according to an exemplary embodiment.

Referring to FIG. 5, a block diagram of system including a resistive touch screen according to an exemplary embodiment is shown. The system includes a processor 500 and memory 504 for embodying processor executable code. The processor 500 receives signals from a touch screen 504 according to the present disclosure. The touch screen 504 includes one or more integrated circuits that resolve one or more touch events on the touch screen 504 and deliver the identified locations to the processor 500. In at least one embodiment, the processor 500 is in data communication with a data storage device 506 for storing resolved touch events.

Embodiments of the present disclosure allow for a much higher intrinsic hardware resolution while using a simple and fast digital scan to detect touches.

Embodiments of the present disclosure may minimize the frame around the display reducing weight. Furthermore, silver epoxy traces are applied by a silkscreen process and vary in thickness and length producing different cross-sectional areas which hinder analog scan processes.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A resistive touch screen apparatus comprising:
   at least two independent ITO track matrixes disposed over different portions of a common display, each comprising a plurality of vertical tracks and a plurality of horizontal tracks;
   at least one integrated circuit disposed on a first vertical edge of the resistive touch screen apparatus, the at least one integrated circuit in data communication with the plurality of horizontal tracks of a first ITO track matrix;
   at least one integrated circuit disposed on a second vertical edge of the resistive touch screen apparatus, the at least one integrated circuit in data communication with the plurality of horizontal tracks of a second ITO track matrix;
   at least two integrated circuits disposed on a first horizontal edge of the resistive touch screen apparatus, a first integrated circuit in data communication with the plurality of vertical tracks of the first independent ITO track matrix and a second integrated circuit in data communication with the plurality of vertical tracks of the second independent ITO track matrix; and
   a controller in data communication with each of the integrated circuits,
   wherein:
      the first integrated circuit on the first horizontal edge and the at least one integrated circuit disposed on the first vertical edge are configured to resolve one or more electrical contacts between a plurality of horizontal tracks and vertical tracks of the first independent ITO matrix solely through a digital scan process;
      the second integrated circuit on the first horizontal edge and the at least one integrated circuit disposed on the second vertical edge are configured to resolve one or more electrical contacts between a plurality of horizontal tracks and vertical tracks of the second independent ITO matrix solely through a digital scan process; and
      the controller is configured to:
         identify a first, second, and third simultaneous, independent touch event; and
         characterize one or more of the independent ITO track matrices as faulty based on the identification of the third touch event.

2. The resistive touch screen apparatus of claim 1, wherein:
   the plurality of horizontal tracks are spaced no more than four millimeters apart; and
   the plurality of vertical tracks are spaced no more than four millimeters apart.

3. The resistive touch screen apparatus of claim 1, wherein:
   the ITO track matrix comprises at least four independent ITO track matrixes disposed over different quadrants of the common display;
   the at least one integrated circuit disposed on the first vertical edge comprises a first integrated circuit disposed on the first vertical edge associated with the first ITO track matrix, and a second integrated circuit disposed on the first vertical edge associated with a third ITO track matrix; and
   and the at least one integrated circuit disposed on the second vertical edge comprises a first integrated circuit disposed on the second vertical edge associated with the second ITO track matrix, and a second integrated circuit disposed on the second vertical edge associated with a fourth ITO track matrix; and
   further comprising at least two integrated circuits disposed on a second horizontal edge of the resistive touch screen apparatus associated with the third ITO track matrix and the fourth ITO track matrix.

4. The resistive touch screen apparatus of claim 1, further comprising a plurality of silver epoxy traces disposed along the first vertical edge and first horizontal edge, each of the silver epoxy traces associated with two horizontal tracks or two vertical tracks.

5. The resistive touch screen apparatus of claim 1, further comprising one or more serial buses connecting each of the integrated circuits to the controller.

6. A mobile platform comprising:
   a resistive touch screen apparatus comprising:
      at least two independent ITO track matrixes disposed over different portions of a common display, each comprising a plurality of vertical tracks and a plurality of horizontal tracks;
      at least one integrated circuit disposed on a first vertical edge of the resistive touch screen apparatus, the at least one integrated circuit in data communication with the plurality of horizontal tracks of a first ITO track matrix;
      at least one integrated circuit disposed on a second vertical edge of the resistive touch screen apparatus, the at least one integrated circuit in data communication with the plurality of horizontal tracks of a second ITO track matrix;

at least two integrated circuits disposed on a first horizontal edge of the resistive touch screen apparatus, a first integrated circuit in data communication with the plurality of vertical tracks of the first independent ITO track matrix and a second integrated circuit in data communication with the plurality of vertical tracks of the second independent ITO track matrix; and a controller in data communication with each of the integrated circuits, wherein:

the first integrated circuit on the first horizontal edge and the at least one integrated circuit disposed on the first vertical edge are configured to resolve one or more electrical contacts between a plurality of horizontal tracks and vertical tracks of the first independent ITO matrix solely through a digital scan process;

the second integrated circuit on the first horizontal edge and the at least one integrated circuit disposed on the second vertical edge are configured to resolve one or more electrical contacts between a plurality of horizontal tracks and vertical tracks of the second independent ITO matrix solely through a digital scan process; and the controller is configured to:
identify a first, second, and third simultaneous, independent touch event; and
characterize one or more of the independent ITO track matrices as faulty based on the identification of the third touch event.

7. The mobile platform of claim 6, wherein:
the plurality of horizontal tracks are spaced no more than four millimeters apart; and
the plurality of vertical tracks are spaced no more than four millimeters apart.

8. The mobile platform of claim 6, wherein:
the ITO track matrix comprises at least four independent ITO track matrixes disposed over different quadrants of the common display;
the at least one integrated circuit disposed on the first vertical edge comprises a first integrated circuit disposed on the first vertical edge associated with the first ITO track matrix, and a second integrated circuit disposed on the first vertical edge associated with a third ITO track matrix; and
and the at least one integrated circuit disposed on the second vertical edge comprises a first integrated circuit disposed on the second vertical edge associated with the second ITO track matrix, and a second integrated circuit disposed on the second vertical edge associated with a fourth ITO track matrix; and
further comprising at least two integrated circuits disposed on a second horizontal edge of the resistive touch screen apparatus associated with the third ITO track matrix and the fourth ITO track matrix.

9. The mobile platform of claim 6, further comprising a plurality of silver epoxy traces disposed along the first vertical edge and first horizontal edge, each of the silver epoxy traces associated with two horizontal tracks or two vertical tracks.

10. The mobile platform of claim 6, further comprising one or more serial buses connecting each of the integrated circuits to the controller.

11. A computer system comprising:
a resistive touch screen comprising:
at least two independent ITO track matrixes disposed over different portions of a common display, each comprising a plurality of vertical tracks and a plurality of horizontal tracks;
at least one integrated circuit disposed on a first vertical edge of the resistive touch screen apparatus, the at least one integrated circuit in data communication with the plurality of horizontal tracks of a first ITO track matrix;
at least one integrated circuit disposed on a second vertical edge of the resistive touch screen apparatus, the at least one integrated circuit in data communication with the plurality of horizontal tracks of a second ITO track matrix;
at least two integrated circuits disposed on a first horizontal edge of the resistive touch screen apparatus, a first integrated circuit in data communication with the plurality of vertical tracks of the first independent ITO track matrix and a second integrated circuit in data communication with the plurality of vertical tracks of the second independent ITO track matrix; and
at least one processor in data communication with the integrated circuits and a memory storing processor executable code for configuring the at least one processor to:
receive one or more digital electrical signals generated via one or more electrical contacts between vertical tracks and horizontal tracks;
resolve the digital electrical signals into a first, second, and third simultaneous, independent touch event on the resistive touch screen; and
characterize one or more of the independent ITO track matrices as faulty based on the identification of the third touch event, wherein:
the first integrated circuit on the first horizontal edge and the at least one integrated circuit disposed on the first vertical edge are configured to resolve one or more electrical contacts between a plurality of horizontal tracks and vertical tracks of the first independent ITO matrix solely through a digital scan process; and
the second integrated circuit on the first horizontal edge and the at least one integrated circuit disposed on the second vertical edge are configured to resolve one or more electrical contacts between a plurality of horizontal tracks and vertical tracks of the second independent ITO matrix solely through a digital scan process.

12. The computer system of claim 11, wherein:
the plurality of horizontal tracks are spaced no more than four millimeters apart; and
the plurality of vertical tracks are spaced no more than four millimeters apart.

13. The computer system of claim 11, wherein:
the ITO track matrix comprises at least four independent ITO track matrixes disposed over different quadrants of the common display;
the at least one integrated circuit disposed on the first vertical edge comprises a first integrated circuit disposed on the first vertical edge associated with the first ITO track matrix, and a second integrated circuit disposed on the first vertical edge associated with a third ITO track matrix; and and the at least one integrated circuit disposed on the second vertical edge comprises a first integrated circuit disposed on the second vertical edge associated with the second ITO track matrix, and a second integrated circuit disposed on the second vertical edge associated with a fourth ITO track matrix; and further comprising at least two integrated circuits disposed on a second horizontal edge of the resistive touch screen apparatus associated with the third ITO track matrix and the fourth ITO track matrix.

14. The computer system of claim 11, further comprising a plurality of silver epoxy traces disposed along the first vertical edge and first horizontal edge, each of the silver epoxy traces associated with two horizontal tracks or two vertical tracks.

15. The computer system of claim 11, further comprising one or more serial buses connecting each of the integrated circuits to the processor.

16. The computer system of claim 11, wherein the at least one processor is further configured to:
associate a plurality of digital signals with a touch event based on temporal proximity, physical proximity, and continuity; and
resolve the first touch event to a location of the resistive touch screen via averaging the locations of the digital signals.

17. The computer system of claim 11, wherein:
the one or more digital signals comprise a plurality of digital signals generated via at least two touch events; and
the at least one processor is further configured to:
associate a first set of digital signals with a first touch event based on temporal proximity, physical proximity, and continuity; and
resolve the first touch event based on the first set of digital signals.

* * * * *